United States Patent [19]

Stoner

[11] Patent Number: 4,715,269
[45] Date of Patent: Dec. 29, 1987

[54] COFFEE MAKER WITH PLASTIC DECANTER AND LOW TEMPERATURE WARMING PLATE

[75] Inventor: Arthur L. Stoner, Signal Hill, Calif.

[73] Assignee: Wilbur Curtis Company, Inc., Los Angeles, Calif.

[21] Appl. No.: 946,862

[22] Filed: Dec. 29, 1986

[51] Int. Cl.⁴ .............................................. A47J 31/00
[52] U.S. Cl. ........................................ 99/279; 99/281; 99/284; 219/432; 219/433; 219/283; 219/443
[58] Field of Search ................ 99/279, 280, 281, 326, 99/331, 284, 288, 290; 219/432, 433, 283, 443

[56] References Cited

U.S. PATENT DOCUMENTS

| | | | |
|---|---|---|---|
| 3,869,968 | 3/1975 | Ihlenfeld | 99/288 |
| 3,978,778 | 9/1976 | Roberts | 99/281 |
| 4,054,085 | 10/1977 | Tarr | 99/284 |
| 4,138,936 | 2/1979 | Williams | 99/282 |
| 4,155,291 | 5/1979 | Ryckman, Jr. et al. | 99/282 |
| 4,331,067 | 5/1982 | Mysicka et al. | 99/295 |
| 4,356,381 | 10/1982 | Flaherty, Jr. et al. | 99/288 |
| 4,503,757 | 3/1985 | Daugherty | 99/281 |
| 4,531,046 | 7/1985 | Stover | 99/281 |

*Primary Examiner*—H. Hampton Hunter
*Attorney, Agent, or Firm*—Fulwider, Patton, Rieber, Lee & Utecht

[57] ABSTRACT

A drip-type coffee maker with efficient heat transfer and minimal heat loss keeps coffee at the optimum temperature for proper flavor over an extended period of time. A closed-top decanter formed entirely of plastic heat insulating material fits into a well which contains a recessed aluminum warming plate. The warming plate is heated to a temperature only slightly above the desired temperature of the coffee. A warming plate adapter is provided for converting existing coffee makers.

23 Claims, 7 Drawing Figures

U.S. Patent Dec. 29, 1987 Sheet 1 of 2 4,715,269
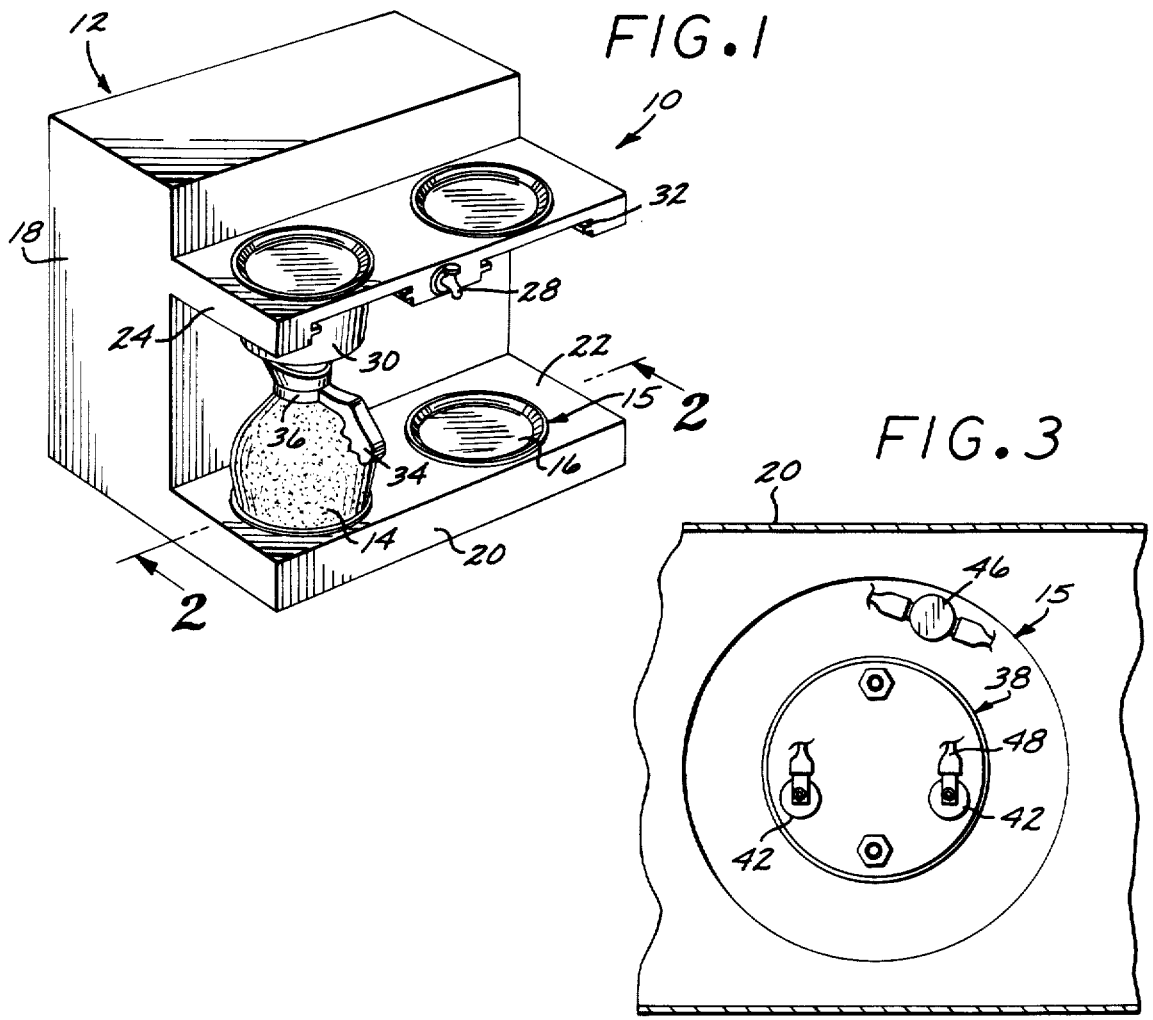
FIG. 1
FIG. 3
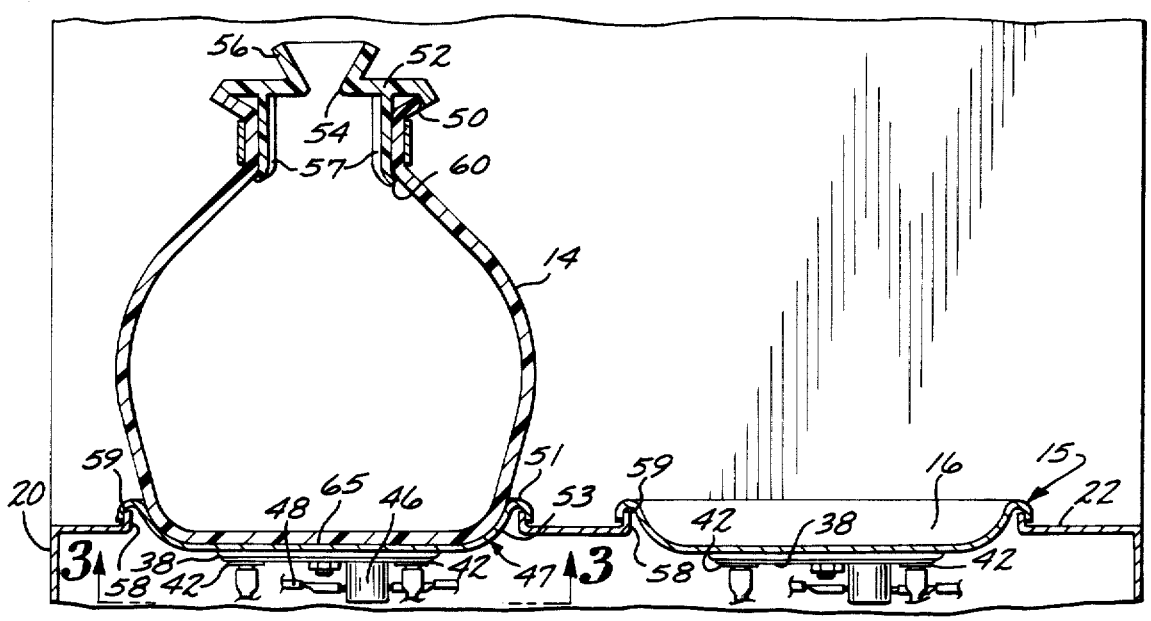
FIG. 2

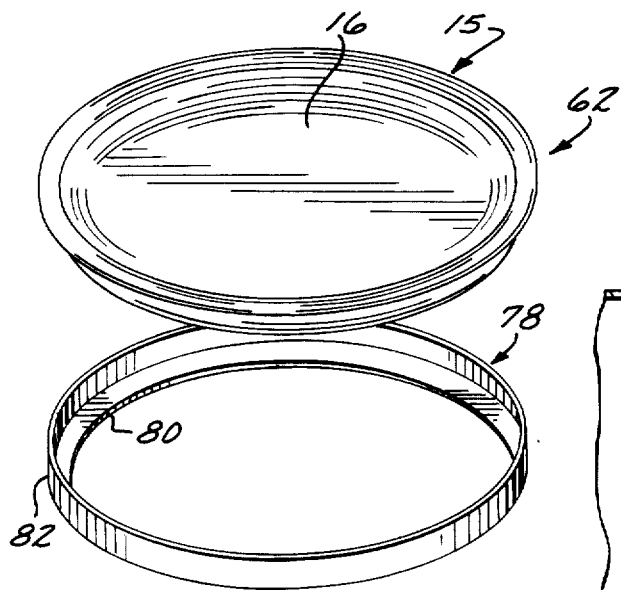
FIG.4
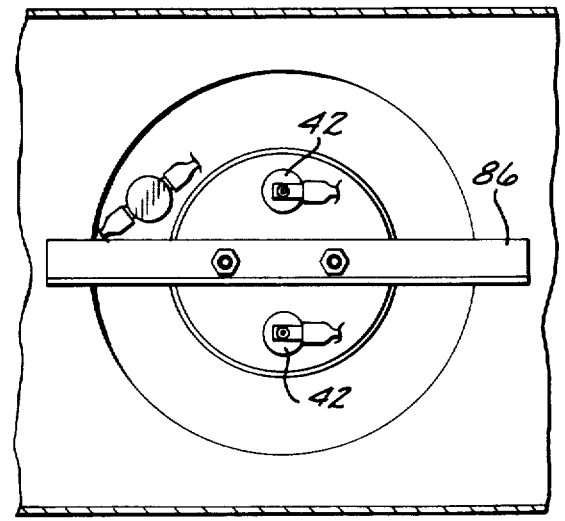
FIG.7
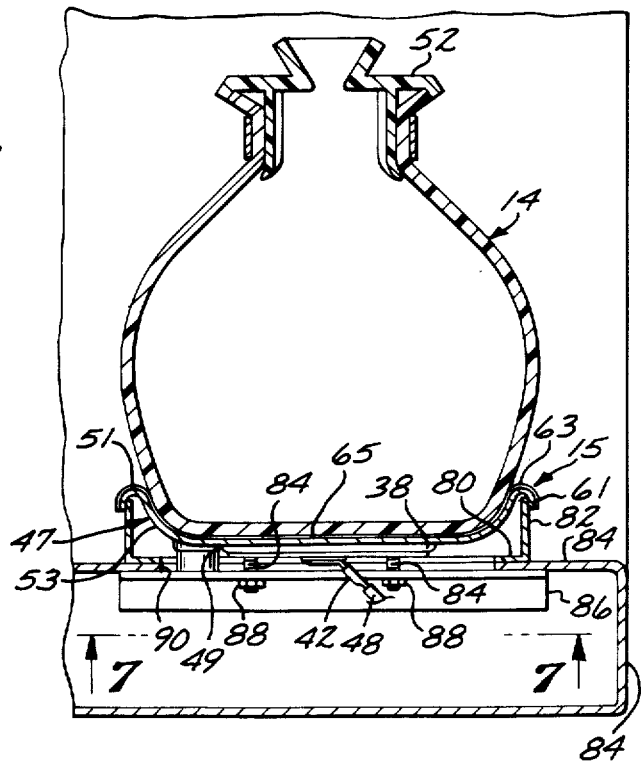
FIG.5
FIG.6

COFFEE MAKER WITH PLASTIC DECANTER AND LOW TEMPERATURE WARMING PLATE

BACKGROUND OF THE INVENTION

1. Field of the Invention:

This invention relates generally to coffee makers and more particularly has reference to a drip-type coffee maker in which a brewing and dispensing unit makes coffee and discharges it into a decanter sitting on a warming plate.

2. Description of the Prior Art:

Existing coffee makers normally use decanters formed entirely of glass or metal. Those materials have a high heat transfer coefficient which causes a substantial heat loss through the walls of the decanter. As a result of such high heat losses, it is necessary to maintain a relatively high temperature on the warming element to maintain the coffee at a sufficiently high temperature to please the palate of coffee drinkers. Plastic, having a lower heat transfer coefficient is a more desirable material to minimize heat loss through the side walls of the decanter but suffers the shortcoming that the rate of heat transferred through the bottom thereof from a relatively flat warming plate is also minimized. Such plastic decanters, thus exhibiting such a high resistance to heat transfer through the bottom wall that the temperature required on the warming plate to maintain the coffee at the desired temperature could be so great as to melt or deform the plastic decanter. Also, heating of the coffee immediately adjacent the bottom wall to such high temperatures, even in the localized area, has a severe detrimental effect on the coffee taste. Thus, there exists a need for a coffee warming well and low coefficient of heat transfer plastic decanter which cooperate to provide for efficient heat transfer therebetween.

In addition, most existing decanters are designed to be uncovered when being filled and when storing a quantity of warm coffee. A substantial amount of heat is lost to air currents circulating across the opening in the top of the decanter. The losses increase when the coffee maker is exposed to air currents in an air conditioned room or office building.

It is common practice to manufacture coffee machines with warming plates which are formed with upturned peripheral rims to retain the coffee decanter generally centered thereon and to act as a cooling fan to dissipate heat to the atmosphere to maintain such peripheral walls at a relatively cool temperature. However, such plates are normally fairly shallow and are not designed to afford a sufficiently close fit with the decanter to produce a sufficiently high rate of heat exchange therebetween to enable use of plastic in the decanter.

The air currents also pass over the warming plate, which typically is a flush mounted flat unit or, at the most, a slightly dished out warming plate loosely receiving the bottom of the decanter. This causes additional heat loss from the bottom of the decanter and from the surface of the warming plate itself and also reduces the efficiency of heat transfer from the warming plate to the decanter.

Coffee must be kept at some optimum temperature, typically about a 180° F., in order to have the proper flavor and taste. Because of the heat losses and inefficient heat transfer which occur in existing coffee makers, the warming plate must often be kept at a temperature of about 350°-400° F. to maintain the coffee at the desired temperature. This produces a hot spot at the bottom of the decanter which overheats the coffee in that region. The resulting deterioration in flavor becomes pervasive as the coffee circulates on thermal currents throughout the decanter.

The hot spot problem is exacerbated when the warming plate is formed of material having a relatively low thermal conductivity. Heat does not distribute evenly across the bottom of the decanter. Rather, it builds up in the regions which are directly above the heating coils under the warming plate. The resulting heat gradient further deteriorates the flavor of the coffee.

Efforts to solve this overheating problems has led to the proposal of coffee warmers incorporating a water reservoir heating to about 200° F. However, use of glass decanter with such warmers resulted in dissipation of heat to the atmosphere at such a great rate that the temperature of the coffee fell below the palatable level.

Glass decanters also pose a significant safety problem. When an empty glass decanter is left on the warming plate, the bottom heats rapidly causing thermal expansion and loss of temper. The weakened bottom cam break off at that time or, more importantly, at some later time when the decanter is filled. Anyone present when the break occurs could be cut by broken glass or burned by scalding hot coffee.

In effort to solve this safety problem, decanters have been fabricated with a plastic upper portion and a thin walled metal lower portion. While eliminating some of the danger associated with glass decanters, the thin metal wall actually accelerates the heat transfer causing rapid deterioration of the coffee flavor. Heretofore, it was not generally recommended that plastic decanters be placed on warming plates because it was believed that the bottom would melt when placed on a warming plate having a sufficiently high temperature to, considering the relatively low heat transfer coefficient of plastic, maintain the body of coffee at the desired temperature for tasty drinking.

Coffee decanters made of plastic material have been known for use in microwave coffee makers, but there the selection of materials is dictated by a requirement for microwave transparency, not for their thermal insulative characteristics.

SUMMARY OF THE INVENTION

The present invention overcomes the problems of the prior art by providing a decanter and warming plate construction which cooperate to substantially improve the heat transfer efficiency to the contained coffee while reducing heat loss from the decanter and eliminating hot spots. This serves to keep the coffee at the optimum temperature over an extended period of time.

The decanter is formed entirely of thermal insulating transparent plastic material such as polysulfone. The relatively low heat transfer coefficient of such material minimizes heat loss through the walls of the decanter. The unitary transparent plastic construction is resistant to breakage and enables the coffee drinkers to view the coffee through the walls of the decanter.

The top of the decanter is closed with a ported lid when being filled and when storing warm coffee. This further reduces heat loss.

The warmer includes a dished out warming plate defining a well shaped to conform closely to the entire lower portion of the decanter wrapping upwardly around the sides thereof to maintain physical contact with the sides of such lower portion. This arrangement enhances the rate of heat transfer to the decanter and minimizes loss of heat to any air currents which might otherwise pass between the warming plate and decanter.

The efficient heat transfer from the warming plate to the coffee, along with the minimized heat losses, allows the present invention to keep the coffee at the optimum temperature (typically about 180° F.) while heating the warming plate to a desired low temperature (typically about 200°-245° F.) depending on the specific insulation characteristics of the decanter. This prevents the formation of a hot spot in the bottom of the decanter and allows the coffee to preserve its proper flavor over an extended period of about three to four hours after brewing.

The use of an aluminum warming well further reduces the occurrence of hot spots without diminishing the insulative capacity of the plastic decanter. The high thermal conductivity of aluminum distributes heat evenly across the bottom of the decanter and prevents a build up of heat in the regions above the heating coils.

The present invention also provides a warming plate adapter which is used to convert an existing coffee maker into one incorporating features of the present invention.

Objects of the invention are, therefore, to provide an improved coffee maker and to provide a drip-type coffee maker with efficient heat transfer to a decanter with minimal heat loss.

Yet another object of the invention is to provide a coffee make which keeps coffee at the optimum temperature for proper flavor over an extended period of time.

A further object of the invention is to provide a coffee maker which is resistant to heat loss caused by atmospheric air currents.

Still another object of the invention is to provide a coffee maker which reduces the occurrence of hot spots and overheating of coffee in the decanter.

Yet another object of the invention is to provide a warming well which provides a uniform distribution of heat across the lower portion of the decanter and prevents localized heat build up immediately above the heating coils.

Still another object of the invention is to provide a decanter for use in a drip-type coffee maker which is transparent and safe to use. Specifically, it is an object of the invention to provide a decanter formed entirely of transparent plastic material.

Another object of the invention is to provide a closed-top decanter for use in a drip-type coffee maker.

Still another object of the invention is to provide a decanter for use in a drip-type coffee maker which is formed entirely of heat insulating material.

Yet another object of the invention is to provide a warming plate for a coffee maker which efficiently transfers heat to the decanter while minimizing heat loss.

Another object of the invention is to provide a recessed well which is dished out and shaped to closely conform to the lower portion of the decanter.

A further object of the invention is to provide a warming well constructed of aluminum to enhance heat distribution.

Still another object of the invention is to provide a coffee maker having a warming plate heated to a temperature only slightly above the desired temperature of the coffee.

A further object of the invention is to provide a warming plate adapter for converting an existing coffee maker into one incorporating features of the present invention.

Other features and advantages of the invention will become apparent from the following detailed description, taken in conjunction with the accompanying drawings, which illustrate, by way of example, the features of the present invention.

BRIEF DESCRIPTION OF THE DRAWINGS

FIG. 1 is a perspective view of a coffee maker embodying features of the present invention;

FIG. 2 is a partial sectional view, in enlarged scale, taken along the line 2—2 of FIG. 1;

FIG. 3 is a fragmentary bottom plan view taken along the line 3—3 of FIG. 2;

FIG. 4 is a perspective view of a warming plate adapter embodying features of the present invention;

FIG. 5 is a perspective view, in reduced scale, of a coffee maker utilizing the adapter shown in FIG. 4;

FIG. 6 is a partial sectional review, in enlarged scale, taken along the line 6—6 of FIG. 5; and FIG. 7 is a bottom plan view taken along the line 7—7 in FIG. 6.

DETAILED DESCRIPTION OF THE PREFERRED EMBODIMENTS

As shown in the drawing for purposes of illustration, and with initial reference to FIG. 1, the invention is embodied, generally, in a drip-type coffee maker 10 of the type having a brewing and dispensing unit 12 for making and discharging coffee into a decanter 14 Which sits on a dish shaped warming plate 15 defining a well 16.

As is well known in the art, the brewing and dispensing unit 12 includes an upstanding portion 18 which houses an internal water reservoir (not shown), a base platform 20 which extends forwardly of the upstanding portion 18 and supports a warming plate table 22, and a cantileverally warming table 24 which extends out from the upstanding portion 18 over to the base 20 and supports an auxiliary warming unit 16 and a hot water faucet 28. The various portions 18, 20 and 24 of the unit 12 are formed generally of molded plastic or sheet metal material.

A filter basket 30 is supported below the upper ledge 24. Guide slots 32 in the ledge 24 slideably receive integral flanges (not shown) formed on the top edge of the filter basket 30. A paper filter cup (not shown) in the basket 30 holds ground coffee beans (not shown). A spout (not shown) on the bottom surface of the basket 30 is aligned with the top of the decanter 14.

In a manner well known in the art, the brewing and dispensing unit 12 heats the water in the internal reservoir and then passes it through various internal conduits and valves (not shown) into the filter basket 30. There, an infusion process takes place whereby the soluble constituents of the coffee beans are extracted or dissolved into the hot water. Coffee is brewed by passing the hot water once through the beans and then discharging it through the spout into the decanter 14. The paper filter cup filters coffee grounds from the infusion.

Additional internal conduits (not shown) are provided to communicate hot water from the reservoir to the hot water faucet 28. The hot water may be selectively discharged from the faucet 28 to make tea or other warm beverages. A handle 34 is connected to the neck of the decanter 14 by an encircling band 36.

The warming plate 15 keeps the coffee in the decanter 14 at the temperature which is optimum for proper flavor and taste. Heat is generated by a circular electrical heating element 38 located in a generally circular configuraion under the central portion of the warming well 16. As is well known in the art, the heating element 38 includes an inner conductor (not shown) of high resistivity material connected to the output terminals 42 of an electrical heating circuit (not shown).

A temperature sensing thermostat 46 in thermal communication with the warming plate 15 is electrically connected to the heating circuit by various wires 48. The thermostat 46 controls the circuit to vary the electrical energization of the inner conductor 40 in a cyclic manner depending upon the sensed temperature of the warming plate 16. The thermostat is designed to maintain the warming plate at an optimum temperature to preserve the coffee flavor.

I will be appreciated that the warming plate 15 must produce sufficient heat to keep the coffee in the decanter 14 at the optimum temperature, which is typically about 180° F. The precise amount of heat which must be produced depends upon various factors including, most importantly, the efficiency of heat transfer between the warming plate 15 and the decanter 14 and the heat losses experienced by the decanter 14. The latter, in turn, depends upon various factors such as the thermal conductivity of the decanter material, heat escape inherent in the configuration of the decanter 14, and exposure of the decanter 14 and warming plate 15 to cool air current circulating through the atmosphere. The efficiency of heat transfer depends upon the structure of the warming plate 15 and its relationship to the decanter 14.

Accordingly, the decanter 14 and warming plate 15 are constructed and arranged to provide efficient heat transfer with minimal heat loss so that the coffee in the decanter 14 can be kept at the optimum temperature over an extended period of time.

The decanter 14 has a unitary construction and is formed entirely of thermal insulating plastic material. Polysulfone is a preferred material because it is transparent, has a relatively low heat transfer coefficient, and is resistant to breakage. For a polysolfone decanter 14 having a wall thickness characteristic of blow molding, it has been found that a warming plate temperature of about 230°-245° is sufficient to maintain the desired coffee temperature. For thicker walled polysolfone decanters, having greater wall thicknesses or a warming plate temperature of about 200° F. has proven satisfactory. This is because the thermal insulating polysolfone walls serve to minimize heat loss to the atmosphere thus acting to retain heat in the coffee contained therein.

The decanter 14 may be of any convenient overall configuration, it only being important that the bottom portion, generally designated 47, have sufficient area and a size and shape which will complementally fit in the well 16 for close physical contact therewith. In the preferred embodiment, the bottom portion 47 is formed with a flat circular bottom wall 49 which turns gradually upwardly in dish fashion at the outer edges to join with the vertical walls of the body of such decanter. To further enhance the rate of transfer to the decanter, the bottom portion is formed with a relatively large diameter of about 6⅛ inches at the top edge 51 of the peripheral wall 53 of the warming plate well 16 to maximize the overall physical contact between the surface of the well 16 and the bottom portion 47.

The exterior surface of the side walls of the decanter 14 are texturized to add to the aesthetic appearance thereof and camouflage any scratches to the surface experienced during use. The open top end 50 of such decanter 14 is normally closed by a removable lid 52 which is preferably formed of a similar thermal insulating plastic material having some coloration, as for instance black. A central port 54 in the lid is aligned with the spout in the bottom of the filter basket 30 when the decanter 14 is placed on the warming plate 16 so that the coffee discharged from the brewing and dispensing unit 12 may be received in the decanter 14 with the lid 52 in place. An annular funnel 56 formed integrally with the lid and disposed about the port 54 directs the coffee through the port 54 and serves as a knob which can be gripped to remove the lid 52 when desired. By closing the top end 50 of the decanter 14 when being filled and when storing warm coffee, the lid 52 reduces heat loss through the top end 50 of the decanter 14. A plurality of resilient legs 57 depend from the bottom of the lid 52 and are disposed in a circular pattern and turned outwardly slightly at their lower extremities to functionally engage under the interior shoulder 60 formed below the neck of the decanter.

The bottom table 22 is typically constructed of sheet metal and the top wall there of is formed with circular openings 58 having upturned lips 59 at the edges thereof for receipt of the heating plates 15.

Referring to FIG. 6, the heater plates 15 are each formed of an aluminum dish-like shell 61 coated with a layer of enamel 63. Such plates are formed with flat bottom walls 65 turned up at their marginal extremities to form the side walls 5 which terminate in the top edge 51 spaced ⅜ inches from the top surface of the bottom wall. The wells 16 of such plates are formed to closely fit the bottom portion 47 of the decanter 14, the diameter thereof being preferably sufficiently small to cause the vertical peripheral walls thereof to physically contact the bottom portion 4 throughout the circumference thereof. In no event should such wells have a diameter which exceeds that of the corresponding diameter of the bottom portion 47 by more than about 1/64 of an inch. The top extremities of the peripheral side walls 53 turn outwardly and then downwardly to form a downwardly opening circular groove which nests over the top edge of an upturned lip 82 formed in an adapter ring, generally designated 62.

It has been proven that the close fit between the well 16 and bottom portion 47, coupled with the relatively deep well 16, provides a rate of heat transfer from the warming plate 15 to the polysolfone decanter 14 that is so efficient that a warming plate temperature on the order of 230°-245° F. will maintain a coffee temperature in the decanter of about 180° F. in a normal air conditioned office environment having a temperature of about 68° F.

This, in addition to avoiding melting of the plastic decanter 14, prevents the formation of hot spots and overheating of the coffee in the bottom of the decanter 14, allowing the coffee to preserve its proper flavor over an extended period of about three to four hours after discharge from the brewing and dispensing unit 12. The overall balance of heat input, heat transfer and heat loss, at a room temperature of about 68° F., allows a relatively low warming plate temperature to maintain the desired coffee temperature, thus avoiding detrimental localized overheating of the coffee and preventing damage to the plastic lower portion of the decanter 14, even when an empty decanter is inadvertently left on a warming plate 16.

For the purpose of illustration, a coffee maker 64 is depicted which includes a conventional warming table 84 having an auxiliary warming table disposed thereover in overhanging relationship. Conventional tables of this type may be constructed of sheet metal or thin plastic and typically have formed in the top walls thereof a pair of circular openings 90 (FIG. 6). Typically, conventional heating plates are mounted in such openings 90 with the heating coils recessed downwardly within the openings 90 and connected with the electrical circuitry (not shown) of the warmer. By utilizing an adapter ring, generally designated 78, the conventional coffee brewer may be converted to a low temperature brewer for use of my new plastic decanter. The adapter ring 78 is L-shaped in cross-section to form a horizontal base ring 80 and the upstanding circular side wall 82. A warming plate 15 may then be fabricated with the heating element 38 mounted directly on the bottom thereof. Mounted from the plate 15 is pair of downwardly projecting mounting studs 84 which secure to a cross bar in the form of an angle iron 86. The angle iron 86 includes a pair of bores in the horizontal leg thereof for receipt of the studs 84, a pair of hex nuts 88 being screwed into the lower extremities thereof.

Thus, for proprietors seeking to convert their existing coffee brewer 64, they need merely purchase four adapter kits 62. The conventional warming plates may then be removed from the four openings 90 and the kits 62 substituted therefor. For example, the adapter ring 62 may be mounted directly on the bottom warming table 84 as shown in FIG. 6 and the angle iron 86 mounted to the studs 84 and the hex nuts 88 screwed thereonto to secure the plate in position.

The electrical leads may then be connected to the electrical contacts 42 of the heating plate 15. The heating plate 15 may then be brought into position with the downwardly opening groove nested over the top edge of the peripheral wall 82 of the ring 78. The equipment is then ready for use.

From the foregoing it will be appreciated that, with the thermostat 42 set to control the heating element 38 at a temperature sufficient to maintain the heating plate 15 at 200° F., the brewed coffee will be maintained at the desired temperature of about 180° F. under normal circumstances. This is because, even though heat is transferred through the vertical walls of the decanter 14 and into the atmosphere, heat is transfered from the well of the heating plate 15 into the coffee at about the same rate. This is because the heat from the heating element 38 will travel rapidly radially outwardly from the heating element along the highly conductive aluminum shell 61 of the heating plate 15 to heat the upwardly turned walls 53 thereof, thus maintaining those walls at a relatively high temperature. Consequently, heat is transferred by direct physical contact into the decanter, not only just along the flat bottom wall of the heating plate 15 but along the interface of the upturned wall 53 and bottom portion 47 of the decanter. Moreover, the close fitting relationship between the upper edge 51 of the heating plate 15 and the bottom portion 47 of the decanter 14 acts as somewhat of an air seal to minimize, if not totally prevent, circulation of air downwardly within the interior of the well 16 to thus minimize the thermal insulative effect of such air and the effectiveness of such air in transferring heat directly from the heating plate 15 into the atmosphere.

While several particular forms of the invention have been illustrated and described, it will be apparent that various modifications can be made without departing from the spirit and scope of the invention.

I claim:

1. A coffee maker comprising:
   a brewing and dispensing unit for brewing and discharging coffee;
   a decanter constructed of heat resistant thermal insulative plastic for receiving coffee discharged from said brewing and dispensing unit and formed with a bottom portion of a predetermined configuration;
   a warming table for receiving the decanter and maintaining the brewed coffee warm therein;
   a heat conductive warming plate mounted on said table and formed with a dished out well having a bottom wall and raised a peripheral wall with peripheral walls configured to complementally receive said bottom portion of said predetermined configuration to enhance heat conduction thereto, and;
   a heating element in thermal communication with said well whereby said decanter may be positioned with said bottom portion nested in said well in direct contact with said peripheral wall for direct heat conduction from said well to said bottom portion.

2. The apparatus of claim 1 wherein:
   said well is formed with a flat bottom portion, said heating element being disposed beneath said flat bottom portion.

3. The apparatus of claim 1 further comprising:
   a temperature sensor disposed in heat exchange relationship with said well and connected with said heating element, said coffee maker further including temperature control means connected between said sensor and heating element and responsive to the temperature sensed by said sensor to control the temperature of said heating element.

4. The apparatus of claim 1 wherein:
   said heat resistant thermal insulative plastic of said decanter is transparent.

5. The apparatus of claim 1 wherein:
   the vertical walls of said decanter are formed in the exterior surfaces thereof with texturing.

6. The apparatus of claim 1 wherein:
   said heat conductive plate is constructed of aluminum.

7. The apparatus of claim 1 wherein:
   said decanter is formed entirely of thermal insulating plastic material.

8. The apparatus of claim 4 wherein:
   said decanter is formed entirely of thermal insulating plastic material.

9. A warming plate adapter for use in a coffee maker of the type having a brewing and dispensing unit for brewing and discharging coffee and formed with a warming table formed with an opening receiving a conventional warming plate, a decanter for receiving brewed coffee discharged from such unit, said decanter being formed with a bottom portion of a predetermined configuration, an electrical heating circuit, said adapter comprising:
   a heat conductive warming plate for mounting on said warming table, over said opening and formed with a dished out well configured with a bottom wall and surrounding peripheral wall cooperating together to complementally fit said bottom portion of said decanter;

mounting means for mounting said heat conductive warming plate over said opening;

an electrical heating element in thermal communication with the well; and connector means for establishing electrical communication between said heating element and electrical heating circuit whereby said conventional warming plate may be removed from said opening, said heat conductive warming plate mounted on such warming table over said opening, and said connector means applied to heat said warming plate so said bottom portion of said decanter may be received in said well in close fitting relationship for effective heat transfer thereto.

10. The apparatus of claim 9 wherein:
said heat conductive warming plate is circular in plan view and constructed and arranged to be detachably received by such brewing and dispensing unit.

11. The apparatus of claim 9 wherein:
said heat conductive warming plate is constructed of aluminum.

12. The apparatus of claim 9 that includes:
an adapter ring configured to be interposed between said warming table and heat conductive heating plate to support said heating plate from said table.

13. A coffee maker for use at room temperature of about 68° F. to brew coffee and maintain it at a warm temperature and comprising:
a brewing and dispensing unit for brewing and discharging the brewed coffee;
a decanter formed with thermally insulative plastic walls defining a chamber for receipt of a predetermined volume of brewed coffee discharged from said brewing and dispensing unit and being formed with an open top and a bottom portion having a predetermined configuration, said decanter including a lid to cover said open top, said walls and lid providing sufficient thermal insulation to, when said cavity is substantially filled with said predetermined volume of coffee at substantially 180° F. at room temperature of about 68° F., limit the heat transfer from said coffee to a predetermined rate;
a warming plate for receiving said decanter and formed with a thermally conductive well configured to receive said bottom portion in close fitting heat exchange relationship, said warming unit including a heating element operative to maintain a selected temperature of about 200° F., said heating plate being constructed of a heat conductive material having a sufficiently high heat transfer coefficient to cooperate with said heating element, well, and decanter to form a heat path from said heating element into said decanter, having a sufficiently low resistance to heat transfer to, when said heating plate is at said 200° F., transfer said heat to said brewed coffee at said predetermined rate.

14. The apparatus of claim 13 wherein:
said walls of said decanter are constructed entirely of plastic.

15. The apparatus of claim 13 wherein:
said well is configured to receive said bottom portion nested for substantial physical contact entirely about the periphery of said bottom portion.

16. The apparatus of claim 13 wherein:
said walls of said decanter are constructed of transparent plastic material.

17. The apparatus of claim 13 wherein:
said walls of said decanter are constructed of polysolfone.

18. The apparatus of claim 13 wherein:
said decanter has a unitary construction.

19. The apparatus of claim 13 wherein:
said lid is formed centrally with a port for receiving brewed coffee therethrough;

20. The apparatus of claim 19 wherein:
said lid is formed of thermal insulating plastic 21. The apparatus of claim 19 further comprising:
a funnel disposed on the lid about said port.

22. The apparatus of claim 21 wherein:
the funnel is formed integrally with said lid.

23. A coffee maker adapter kit for mounting on a coffee maker of the type including a warming table formed with an opening and mounting a conventional heating element in such opening, such kit being adapted for warming a coffee decanter having a bottom portion including a bottom wall turning upwardly and outwardly at the periphery thereof and defining a predetermined configuration, said kit comprising;
a thermally conductive warming plate for support on such base in overlying relationship on such opening and formed with an upwardly opening recessed well formed with side walls projecting upwardly and outwardly along the sides of such bottom portion in physical contact therewith and then being turned further outwardly and then downwardly to form a downwardly opening circular groove;
an electrical heating element mounted on the bottom of said warming plate; and
an adapter ring for mounting on such table surrounding such opening and formed with a vertical wall formed with a top edge adapted for receipt in said groove whereby said conventional heating element may be removed from said opening, said adapter ring mounted on said table about said opening and said warming plate nested thereon with said edge received in said groove.

* * * * *

UNITED STATES PATENT AND TRADEMARK OFFICE
CERTIFICATE OF CORRECTION

PATENT NO. : 4,715,269
DATED : December 29, 1987
INVENTOR(S) : Arthur L. Stoner

It is certified that error appears in the above-identified patent and that said Letters Patent is hereby corrected as shown below:

Column 5, line 21, delete "I" and insert --It--;

Column 6, line 35, delete "5" and insert --53--;

Column 6, line 41, delete "4" and insert --47--;

Column 9, line 19, delete "oonductive" and insert --conductive--.

Signed and Sealed this

Fourteenth Day of June, 1988

Attest:

DONALD J. QUIGG

Attesting Officer　　　Commissioner of Patents and Trademarks